H. A. POPPENHUSEN & J. HARRINGTON.

FURNACE.

APPLICATION FILED OCT. 7, 1910.

Reissued Nov. 15, 1910.

13,168.

3 SHEETS—SHEET 1.

H. A. POPPENHUSEN & J. HARRINGTON.

FURNACE.

APPLICATION FILED OCT. 7, 1910.

Reissued Nov. 15, 1910.

13,168.

3 SHEETS—SHEET 2.

H. A. POPPENHUSEN & J. HARRINGTON.

FURNACE.

APPLICATION FILED OCT. 7, 1910.

Reissued Nov. 15, 1910.

13,168.

3 SHEETS—SHEET 3.

Witnesses:
H. H. Hyde
R. W. Doll

Inventors
Herman A. Poppenhusen
Joseph Harrington
By Poole & Brown Attys

UNITED STATES PATENT OFFICE.

HERMAN A. POPPENHUSEN, OF EVANSTON, AND JOSEPH HARRINGTON, OF RIVERSIDE, ILLINOIS.

FURNACE.

13,168. Specification of Reissued Letters Patent. Reissued Nov. 15, 1910.

Original No. 901,038, dated October 13, 1908. Serial No. 375,587. Application for reissue filed October 7, 1910. Serial No. 585,897.

*To all whom it may concern:*

Be it known that we, HERMAN A. POPPENHUSEN and JOSEPH HARRINGTON, citizens of the United States, residing at Evanston and Riverside, respectively, in the county of Cook and State of Illinois, have invented certain new and useful Improvements in Furnaces; and we do hereby declare that the following is a full, clear, and exact description thereof, reference being had to the accompanying drawings, and to the letters of reference marked thereon, which form a part of this specification.

This invention relates to improvements in furnaces of that kind provided with automatic stoking devices, or means by which fuel fed to the furnace is continuously advanced or moved in a horizontally disposed layer along or through the combustion chamber of the furnace during the progress of combustion.

The invention consists in the matters hereinafter described and pointed out in the appended claims.

Figure 1:
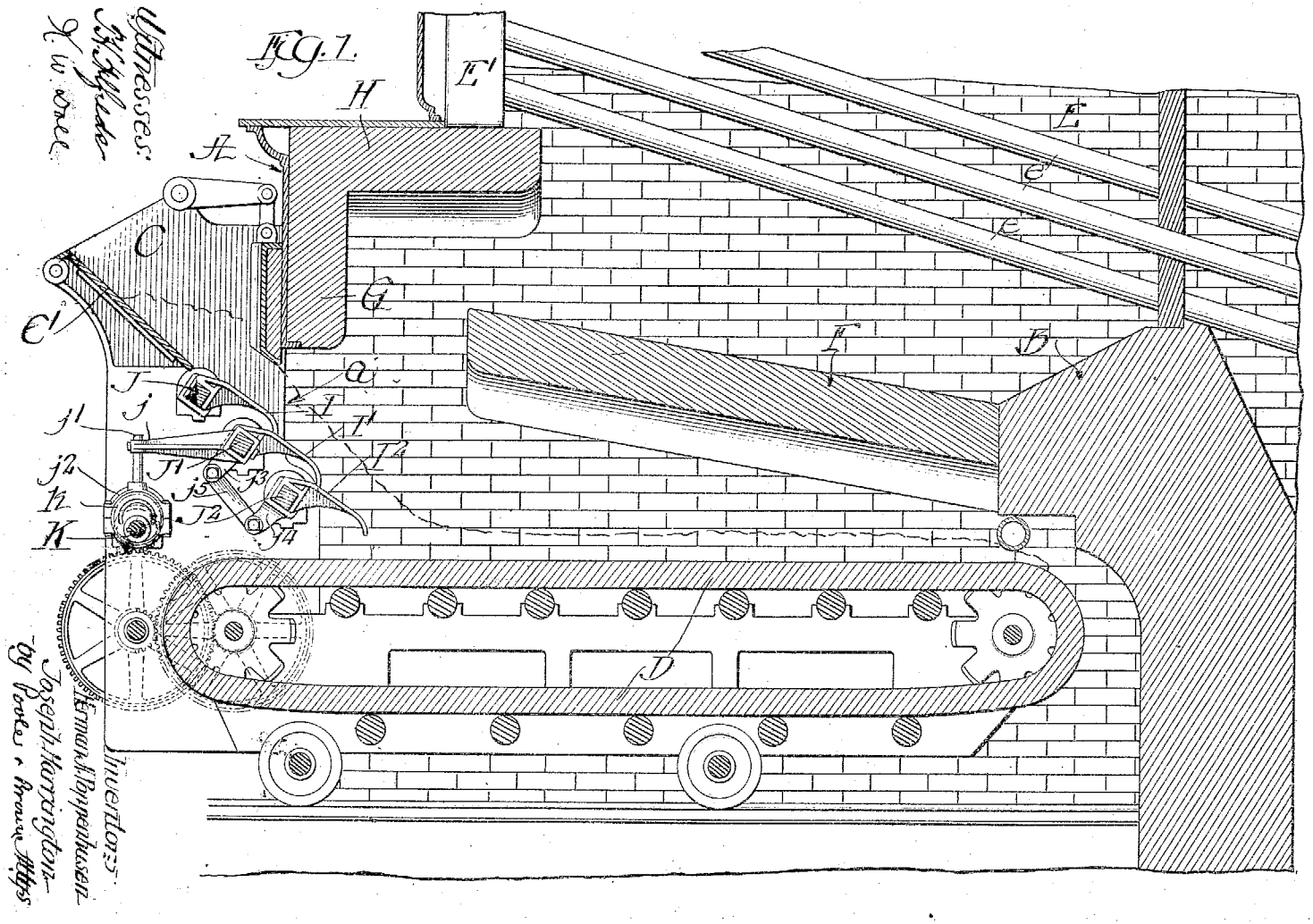
Figure 2:
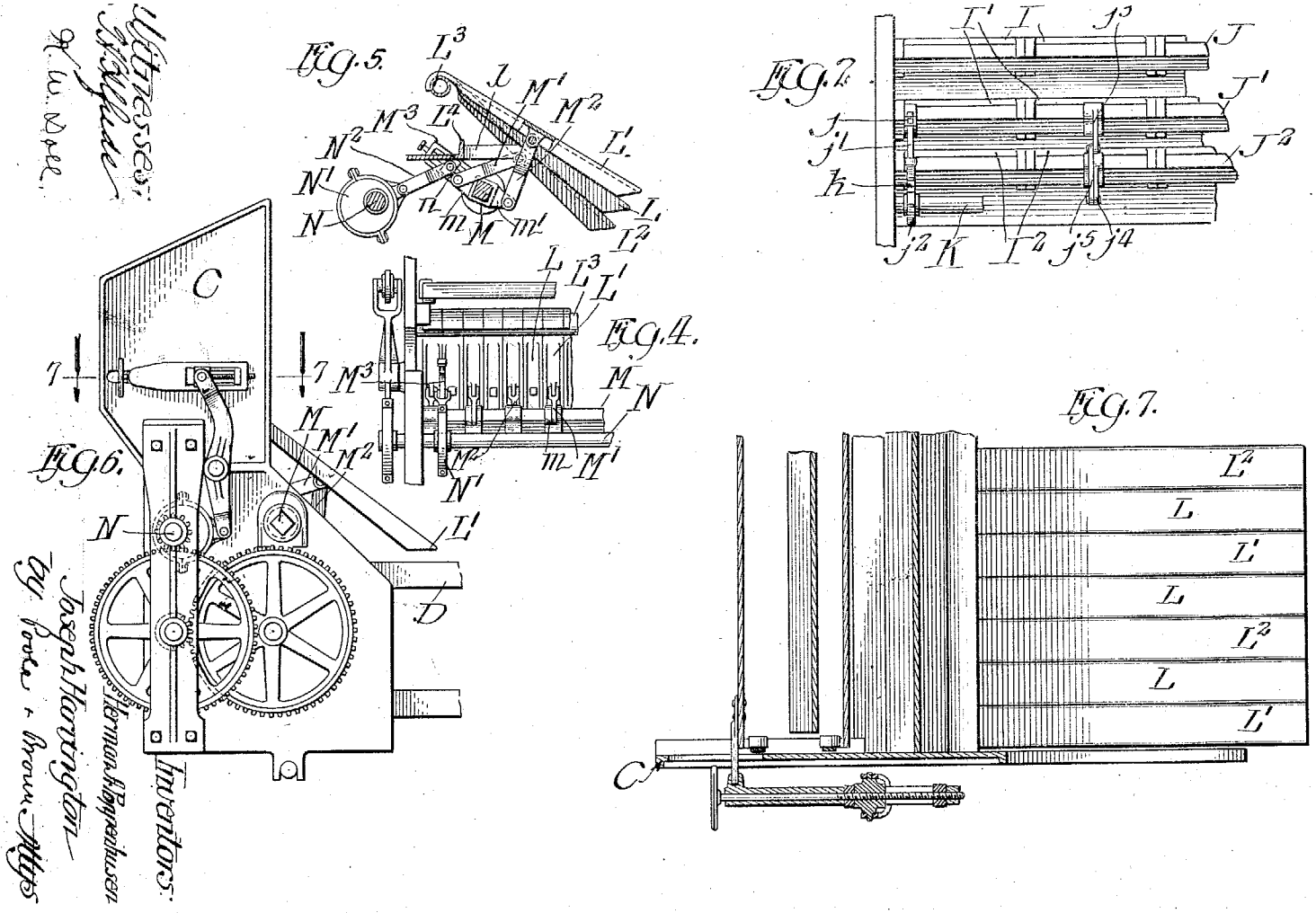
Figure 3:
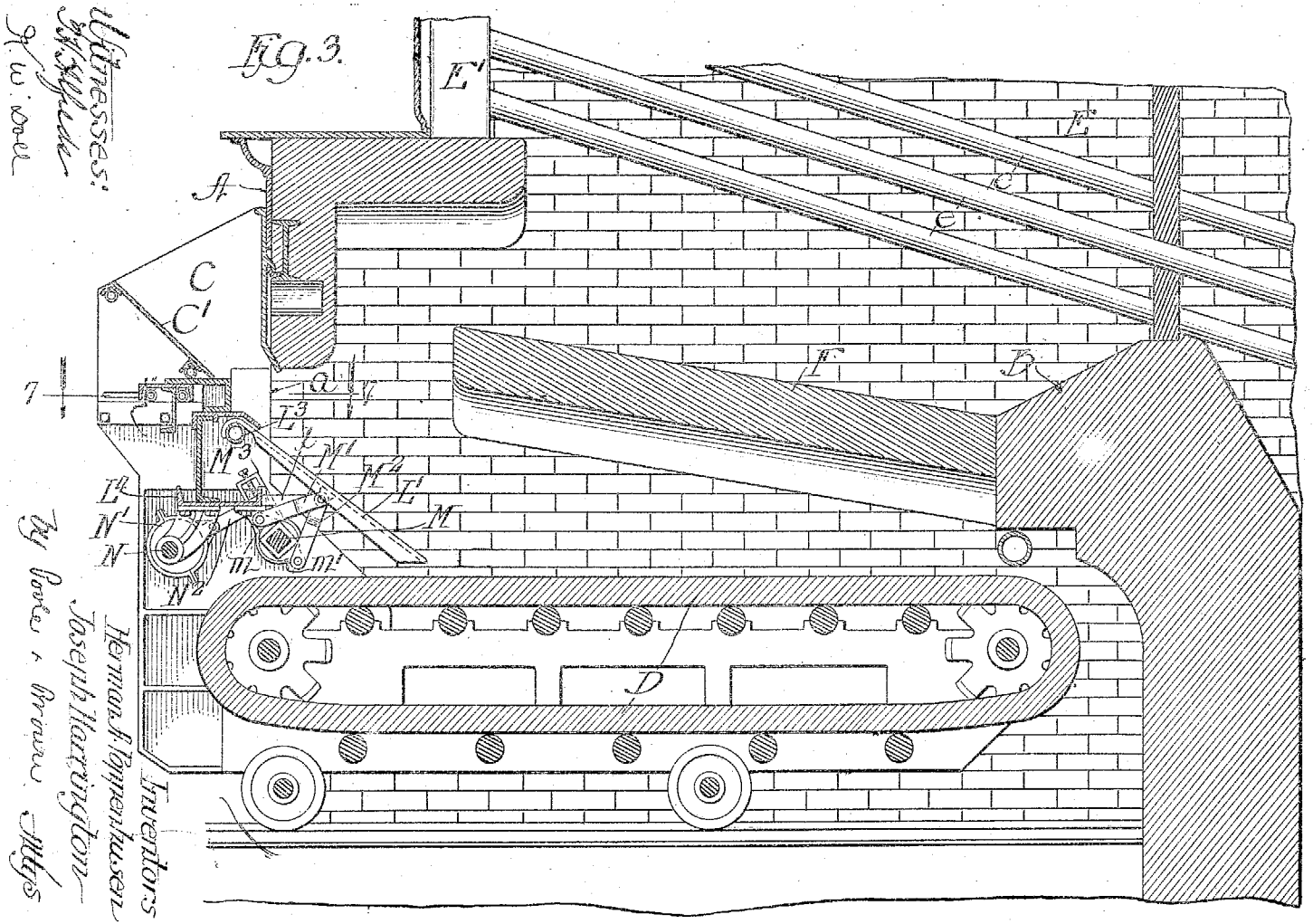

In the accompanying drawings illustrating our invention: Figure 1 is a view in central vertical section of the furnace embodying one form of our invention. Fig. 2 is a detail elevation of the transverse fuel supporting plates at the forward end of the furnace, as seen from the front of the furnace. Fig. 3 is a sectional view similar to Fig. 1 showing a modified form of construction of the parts constituting our invention. Fig. 4 is a detail elevation of a portion of the inclined fuel supporting bars shown in Fig. 3, as seen from the front of the furnace. Fig. 5 is a detail view showing three of the inclined fuel supporting bars and the actuating devices thereof. Fig. 6 is an exterior side view of the parts at the forward end of the device shown in Fig. 3. Fig. 7 is a detail plate section, taken on line 7—7 of Fig. 3.

As shown in the accompanying drawings, A designates the top wall of the furnace, and B the bridge wall thereof.

C indicates a fuel hopper located on the front wall of the furnace in connection with the fuel inlet or feed opening *a* thereof.

D indicates an endless traveling or chain grate of that class which is moved or driven by suitable actuating devices in such manner that the upper lap of the grate moves inwardly or from the feed opening toward the bridge wall of the furnace; said upper lap being substantially horizontal.

E indicates a boiler, shown in said figures as a water tube boiler, having a front header $E^1$ and a plurality of water tubes *e* which extend downwardly and rearwardly from said header.

F indicates a deflecting arch or partition which extends from the bridge wall B forwardly over the grate to a point near the front wall A of the furnace, a space being left between the forward edge of said partition and the front wall, which space constitutes the outlet opening for the upward or outward passage of the products of combustion. Said bridge wall B is extended upwardly past the top surface of the grate and joins the rear margin of the said deflecting arch or partition. G is a wall, of fire brick or like refractory material, which is built against the front wall A of the furnace above the feed opening, to protect said front wall, and H is an arch which extends rearwardly from the top of the wall G and forms a protection for the front header $E^1$ of the boiler; said parts being arranged to afford space for the passage of products of combustion around the forward edge of the said deflecting partition F on their way to the stack or exit flue of the furnace. As shown in Figs. 1 and 3, the said arch or partition F is inclined upwardly and forwardly from its rear end at which it is joined to the bridge wall, but it need not necessarily be so inclined. At the forward end of and above the chain grate D, in position to receive the fuel discharged from the feed hopper C is an inclined fuel support arranged at an angle corresponding substantially with the angle which will be assumed by the upper surface of a layer of coal resting thereon under the action of gravity. Said inclined fuel support is provided with means for agitating the layer of coal resting thereon in such manner as to aid the downward movement thereof and to prevent the same from caking during the coking operation which takes place when the coal is passing over said support.

In the construction shown in Figs. 1 and 2 said inclined support is formed by means of three transversely extending, inclined and overlapped metal plates I, I, $I^2$. Said plates are arranged with the upper edge of the uppermost plate I adjacent to the lower edge of the bottom wall $C^1$ of the feed hopper C, and with the lower edges of said upper plate I and the intermediate plate $I^1$ overlapping the adjacent plates below them. The lower margins of said plates I, $I^1$, $I^2$ are shown as deflected downwardly so as to form a series of transversely extending ledges or shoulders in the supporting surface formed by the said plates. Said ledges or shoulders constitute means to aid in preventing the layer of fuel resting on the plate and moving downwardly over the same becoming caked into a solid mass by the action of the heat to which it is subjected, as hereinafter set forth. The said plates I, $I^1$, $I^2$ are movably supported in such manner that their lower edges may be oscillated or vibrated for the purpose of aiding in the downward movement of the layer of coal and to prevent the caking of said layer. As shown in said Figs. 1 and 2, the said plates are attached to and supported upon horizontal rock-shafts J, $J^1$, $J^2$ which are mounted in bearings at their ends and afford oscillatory supports for the individual plates. Devices are provided for giving oscillatory movement to said rock-shafts which, as shown in Figs. 1 and 2, is constructed as follows: The intermediate rock-shaft $J^1$ is provided with forwardly extending horizontal arms $j$ $j$ the outer ends of which are connected with upright rods $j^1$ which are attached at their lower ends to eccentric straps $j^2$ engaging eccentrics $k$ $k$ mounted on a transversely arranged horizontal rotative shaft K. By the turning of said shaft K the eccentrics $k$ $k$ act through the rods $j^1$ $j^1$ to give oscillatory movement to the arms $j$ $j$ which oscillatory movement is transmitted to the rock-shaft $I^1$ and the fuel supporting plate $I^2$ attached to said rock-shaft. Oscillatory movement is given to the lowermost rock-shaft $J^2$ and the lowermost supporting plate $I^2$ by connections between the rock-shafts $J^1$ and $J^2$, consisting, in the instance shown, of rigid, radial arms $j^3$ $j^4$ on said rock-shafts, which arms are connected with each other by means of connecting rods or links $j^5$ $j^5$. In the construction shown in the drawing, the uppermost rock-shaft J and the supporting plate I are not directly moved or actuated but a certain amount of oscillatory movement is given thereto by reason of contact of the lower edge of said plate I with the upper portion of the oscillating plate $I^1$ on which it rests.

From the construction described in the plates I, $I^1$, $I^2$ it will be seen that the lower margins of said plates are given a vibratory or shaking movement tending to aid or facilitate the downward movement of the layer of coal resting thereon. It will also be observed that the presence of the transverse ledges or shoulders formed by the lower marginal parts of said plates in connection with the vibratory movement given to said lowermost margins of the plates will have the effect of agitating the downwardly moving layer of fuel resting on said plates, in such manner as to break up the same or prevent it becoming solidified into a continuous mass by the action of the coking heat to which it is subjected and that the breaking up or disintegration of the mass takes place without disturbing the layer to such extent as to result in the turning over, mixing up or the imparting of a rolling motion to the fragments of the mass.

In the operation of the fuel supporting means consisting of the supporting plates I, $I^1$, $I^2$ and the horizontal traveling grate D, fuel will be fed from the feed hopper C in a layer of uniform thickness and the layer of fuel thus discharged upon the inclined supporting surface formed by said plates will rest thereon with its surface inclined substantially at the natural "angle of repose" of the coal under the action of gravity; the mass or layer on said supporting surface being sustained thereon by the contact of the lower part of said layer with the traveling grate which, in its rearward movement carries rearwardly the coal from the lower part of said inclined layer, thereby permitting the latter to descend or slide downwardly along or over said inclined surface at a rate of speed depending upon the rate of travel of the chain grate. The gaseous products of combustion arising from the burning of the fuel upon the chain grate, rise into contact with the deflecting wall or partition F and by the latter are deflected forward toward the front of the furnace and against the surface of the layer of coal resting upon the said supporting plates I, $I^1$, $I^2$ and thereafter pass upwardly around the forward edge of said arch or partition. The products of combustion being highly heated operate by their contact with the layer of coal resting on said inclined supporting surface to effect a preliminary heating or coking operation by which the volatile constituents of coal are driven off, and the coal is prepared for burning of its less volatile constituents as soon as it reaches the chain grate, through which air is supplied to effect combustion. The said inclined supporting surface is substantially without air inlet openings, so that it is in effect non-aerating; the coking of the coal thereon being effected solely by the heat transmitted to the upper surface thereof from the heated products of combustion, and no air being admitted to the layer of fuel until after the latter passes from said supporting surface to the chain grate. The gaseous products of combustion distilled from the coal on said inclined surface will be mixed with and ignited by the highly heated products of combustion arising from the burning fuel on the grate, and with said highly heated products of combustion will be deflected forwardly and pass upwardly around the front end of the deflecting arch or partition. In the case of bituminous or semi-bituminous coal the preliminary heating or coking operation will result in a tendency to solidify the mass or layer resting upon and traveling downwardly over the plates I, $I^1$, $I^2$, while the volatile constituents are being distilled therefrom, or, in other words, tends to effect a caking of the coal by the melting and running together of some of the fusible constituents thereof. The caking of the coal or the cohesion of its particles to form a solid mass is, however, prevented through the disturbance or agitation thereof resulting from the movement downwardly over the transverse shoulders or ledges hereinbefore referred to and also by the shaking or vibratory movement given to the lower edges of said plates, I, $I^1$, $I^2$, so that when the layer of coal reaches and is deposited upon the chain grate it is broken into fragments and is therefore prepared for the rapid combustion thereof as soon as it reaches the chain grate; its fragmentary condition permitting the free passage therethrough of air for supporting combustion.

In the modified construction of the inclined supporting surface illustrated in Figs. 3 to 7, said surface is formed by a plurality of parallel, downwardly and rearwardly inclined, narrow plates or bars L, $L^1$, $L^2$ supported at their upper ends upon a transverse horizontal pivot rod $L^3$, and having their lower ends terminating adjacent to and above the top surface of the chain grate D. The bars L are fixed or stationary, being supported in position by rigid arms *l* thereon, which bear against a horizontal, transverse girder $L^4$ extending across the front of the furnace below the feed hopper. The bars $L^1$ and $L^2$ which are arranged in alternation with the fixed bars L, are adapted to swing or oscillate at their lower ends. The bars $L^1$ have movement upwardly from the plane of the fixed bars L while the bars $L^2$ have movement downwardly from said plate. Provision is made for giving vibratory movement to the lower ends of said bars $L^1$ and $L^2$ consisting of a horizontal rock-shaft M provided with oppositely extending, rigid arms *m* $m^1$, one for each of the bars $L^1$ and $L^2$. Each arm *m* is connected with one of the bars $L^2$ by means of a connecting rod $M^1$ and each of the arms $m^1$ is connected with one of the bars $L^1$ by a connecting rod $M^2$. With this construction when the rock-shaft M is rocked alternate oscillatory movement is given to the two sets of bars $L^1$ $L^2$ in such manner that the bars $L^1$ rise above the bars L and the bars $L^2$ descend below the said bars L, with the result of agitating the layer of fuel resting on the inclined surface formed by the several bars and thereby preventing the caking of the same, without otherwise disturbing said layer, as before described, in the case of the construction shown in Figs. 1 and 2. The rock-shaft M may be given oscillatory movement from a rotative shaft N by means of an eccentric $N^1$ on said shaft, and an eccentric rod $N^2$ which is pivotally connected with a block *n*, mounted on a rigid arm $M^3$ affixed to one end of the rock-shaft M; said block *n* being adjustably mounted on said arm $M^3$, so as to provide for adjustment of the extent of rocking movement in the rock-shaft.

By the employment in a furnace of the parts or features herein set forth, namely, an endless traveling or chain grate having a substantially horizontal fuel supporting surface, an inclined fuel support between the feed hopper and the forward end of said chain grate provided with means for agitating the layer of fuel resting thereon in such manner as to prevent the same becoming solidified into a solid cake or mass by the coking operation, and from the lower end of which the coal is removed and carried rearwardly by and upon the chain grate, a substantially horizontal arch or partition extending from the rear end of the chain grate forwardly over the same and terminating adjacent to the said inclined fuel support at the forward end of the furnace so as to deflect substantially all of the highly heated gaseous products of combustion toward or against the incoming layer of fresh fuel resting on said inclined fuel support and effect the mixture of the said highly heated products of combustion with the gaseous products distilled from such fresh fuel, advantages in operation are obtained and improved results arise which are not secured in furnaces heretofore constructed and which may be understood from the following: In the operation of the furnace constructed as hereinbefore set forth, the layer of coal resting upon the inclined supporting surface at the forward end of the furnace is subjected to a distilling or coking operation by which the volatile constituents of the coal are driven off, and said volatile constituents, being immediately brought into contact or mixed with the highly heated products of combustion which are deflected forwardly over the layer of coal on said inclined supporting surface by the deflecting arch or partition, are entirely burned or consumed. The agitation to which said layer of coal resting upon the said inclined supporting surface is subjected continuously breaks up the said layer during the process of distillation, so that it reaches the surface of the traveling chain grate in a fragmentary condition, thereby permitting the free passage of the air therethrough to effect rapid and complete combustion thereof. After the lower layer of coal reaches the chain grate it moves rearwardly thereon without disturbance or agitation until completely consumed.

One important advantage arising from the particular arrangement or combination of the parts described, is that of the avoidance or formation of clinkers during the progress of combustion of the layer of fuel through the furnace. This result arises from the fact that there is no disturbance or agitation of the layer of fuel, when upon the inclined supporting surface or upon the chain grate, such as would result in the lower part of the layer being brought to the top of such layer and subjected to the high heat within the interior of the furnace. It will be understood in this connection that the formation of clinkers usually arises from the lower parts of the layer of fuel resting on a grate being brought to the top of said layer when nearly consumed or reduced to ashes with the result that the incombustible constituents of the ashes are fused and clinkers are produced. In a furnace made and operating as hereinbefore described, the layer of fresh fuel is broken up while being subjected to the preliminary coking operation on the inclined supporting surface and before such layer of the fuel reaches the point at which combustion takes place, so that after the layer reaches the chain grate, no further disturbance or agitation of the layer is required in order to permit the free passage of air therethrough. Moreover, there is no breaking up or rolling over of the coal while resting upon the inclined surface, such as would tend to the production of clinkers, it being manifest that if the layer on the inclined surface be not stirred up, but only broken or fractured, the surface portion thereof, which is first coked or prepared for combustion, will remain at the top of the layer on the chain grate, while the lower part of said layer, which is less nearly prepared for combustion, will first receive the action of the air on reaching the grate. The coking action will have extended through the entire thickness of the layer on the inclined supporting surface by the time the said layer reaches the bottom of the same and reaches the chain grate, and such layer will then be thoroughly prepared for combustion without the formation of clinkers, because its lower portion which has been least subjected to the coking operation will be more directly acted upon by the incoming air to effect combustion thereof, while the upper part of the layer, having been more thoroughly coked, will be in readiness for burning with the relatively smaller supply of oxygen which will reach said upper part of the layer as the air passes through the same from below.

Another important advantage gained by the construction described is that of the increase of igniting effect arising from the better preparation of the fuel for ignition and complete combustion. This is due to the fact that the heated gaseous products of combustion from the entire layer of fuel on the horizontal grate surface are deflected forwardly against the layer of coal resting upon the inclined supporting surface, thereby giving increased coking effect according to the increase of fuel fed into the furnace. In prior constructions in which an igniting arch is located over the forward end of a traveling chain grate there has been no increase of coking effect upon an increase of the amount of fuel fed to the furnace, because the ignition arch is heated only by the heat radiated from the forward part of the layer of burning fuel on the grate and there is therefore no more heat transmitted from the ignition arch to the greater amount of incoming fresh fuel when the feed is rapid than to the lesser amount of incoming fresh coal when the feed is slow. Manifestly, in the operation of a furnace made as described, the increase in the rate of feed will result in a larger quantity of fuel being burned upon the chain grate and the heat resulting from the combustion of such larger quantity of fuel will produce an increased heating effect upon the incoming fuel substantially corresponding to the increase in the rate of feed.

Another advantage gained by the construction of the furnace embodying our invention may be understood from the following: In all traveling chain grates the layer of fuel resting upon the grate is much thinner at the rear end of said grate than at the front end thereof, so that there is less resistance to the upward passage of air through the layer at the rear than at the front end of the grate. As a consequence there will usually be an excess of air supply to the furnace at the rear portion, and a deficiency of such air supply at the front portion, of the grate. When an ignition arch is employed at the forward end of the chain grate and the gaseous products of combustion rise from the fuel on the grate between the rear margin of said ignition arch and the bridge wall of the furnace, the points of deficiency and excess in air supply are widely separated, and the gases containing excess of oxygen entering the space above the grate at the rear portion thereof, may not become mixed with that containing a deficiency of oxygen rising from the forward part of the grate to such extent as to produce complete combustion before the heated products of combustion reach the region of lower temperature which is always found adjacent to the boiler tubes or other surfaces of the boiler. Moreover, as the excess of air supply at the rear of the furnace increases, the temperature in that part necessarily decreases, and such excess of air supply and decrease of temperature may prevail to such extent as to prevent any combustion even if mixture with the gases from the forward part of the furnace takes place. In the furnace made as hereinbefore set forth, air passing through the thinner portion of the layer of fuel at the rear end of the grate and containing an excess of oxygen is deflected forwardly by and highly heated in its passage beneath, the horizontal partition or deflecting arch, and, at the forward end of the furnace is mixed with the gaseous products containing little or no oxygen, but which are at a high temperature, with the result of producing complete combustion of the volatile combustible elements before the gaseous products of combustion reach the region of lower temperature at the upper part of the furnace. In the construction hereinbefore set forth, moreover, the direction of movement of the heated products of combustion, being toward the front of the grate, is against the direction of fuel feed, with the result that the combustion of said fuel is aided by the action thereon of heat from said products of combustion and does not depend solely upon the transmission of heat from the burning to the unburned fuel through the fuel itself, but the incoming fresh fuel is heated by the said products of combustion from the rear part of the furnace containing excess air at a high temperature to such extent, before it reaches the chain grate, that combustion of said fresh fuel takes place as rapidly as said fresh fuel reaches the grate.

We are aware that a deflecting arch or partition adapted to direct the products of combustion in a furnace forwardly toward a layer of coal resting upon an inclined fuel support at the forward end of the furnace, has heretofore been used, and that a similarly acting deflecting arch or partition has been employed in connection with the chain grate but without any supporting surface on which the fuel is sustained or held during a preliminary coking operation. We believe to be novel, however, a construction in which there is combined a horizontally arranged traveling chain grate, a substantially horizontal deflecting partition or arch arranged to deflect the products of combustion toward the forward end of the furnace, and an inclined support adapted to sustain a layer of fuel during a preliminary distilling or coking operation and which is provided with means for continuously agitating and breaking up the layer of fuel resting thereon, and in which the layer of coked coal is transferred from said inclined surface to the chain grate and moves rearwardly thereon without disturbance or agitation, this construction and arrangement of parts producing results distinctly different from those heretofore obtained, as pointed out.

We claim as our invention:—

1. In a furnace, the combination of a traveling grate having a substantially horizontal fuel supporting surface, and an inclined, non-aerating fuel support at the forward end of the grate adapted to sustain a layer of fuel during a preliminary coking operation, and for the downward movement of said layer thereover by the action of gravity to the forward end of the grate, said fuel support embracing fuel agitating means adapted to maintain the coal in said layer in a fragmentary condition without stirring or mixing the same during the coking operation.

2. In a furnace, the combination with a traveling grate having a substantially horizontal fuel supporting surface, and an inclined, non-aerating fuel support at the front of the furnace adapted to sustain thereon a layer of fuel during a preliminary coking operation, and for the downward movement of said layer of fuel thereover by the action of gravity, said support embracing a plurality of vibrating plates forming agitating means by which the coal in said layer is maintained in a fragmentary condition without stirring or mixing the same, during the coking operation.

3. A furnace provided with a traveling grate, and an inclined, non-aerating fuel support at the forward end of said grate, said support consisting of a plurality of transverse, horizontal, overlapping, inclined pivotally supported plates formed to provide transverse ledges or shoulders in said inclined support, and means for giving oscillatory motion to said plates.

4. In a furnace, the combination of a traveling grate having a substantially horizontal fuel supporting surface, a substantially horizontal deflecting partition extending from the rear end of the furnace forwardly over said grate, to a point near the forward end of the grate, and an inclined, non-aerating fuel support at the forward end of the grate adapted to sustain a layer of fuel during a preliminary coking operation, and for the downward movement of said layer thereover by the action of gravity to the forward end of the grate, said fuel support embracing fuel agitating means adapted to maintain the coal in said layer in a fragmentary condition without stirring or mixing the same during the coking operation.

5. In a furnace, the combination with a traveling grate having a substantially horizontal fuel supporting surface, a deflecting partition extending from the rear end of the furnace forwardly over said grate, and an inclined, non-aerating fuel support at the front of the furnace adapted to sustain thereon a layer of fuel during a preliminary coking operation, and for the downward movement of said layer of fuel thereover by the action of gravity, said support embracing a plurality of vibrating plates forming agitating means by which the coal in said layer is maintained in a fragmentary condition without stirring or mixing the same, during the coking operation.

6. A furnace provided with a traveling grate, a deflecting partition extending from the rear end of the furnace forwardly over said grate, and an inclined, non-aerating fuel support at the forward end of said grate, said support consisting of a plural of transverse, horizontal, overlapping, inclined, pivotally supported plates formed to provide transverse ledges or shoulders in said inclined support, and means for giving oscillatory motion to said plates.

In testimony that we claim the foregoing as our invention we affix our signatures in the presence of two witnesses, this 3rd day of October, A. D. 1910.

HERMAN A. POPPENHUSEN.
JOSEPH HARRINGTON.

Witnesses:
GEORGE R. WILKINS,
T. H. ALFREDS.